(12) United States Patent
Lu et al.

(10) Patent No.: US 11,572,896 B2
(45) Date of Patent: Feb. 7, 2023

(54) QUICK-RELEASE MECHANISM FOR FAN, FIXING ASSEMBLY FOR FAN, AND FAN ASSEMBLY

(71) Applicant: GIGA-BYTE TECHNOLOGY CO., LTD., New Taipei (TW)

(72) Inventors: Chia-Chen Lu, New Taipei (TW); Ching-Chuan Huang, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 30 days.

(21) Appl. No.: 17/409,821

(22) Filed: Aug. 24, 2021

(65) Prior Publication Data
US 2022/0065268 A1 Mar. 3, 2022

(30) Foreign Application Priority Data
Sep. 2, 2020 (TW) .................................. 109130112

(51) Int. Cl.
*F04D 29/60* (2006.01)
*G06F 1/20* (2006.01)

(52) U.S. Cl.
CPC .............. *F04D 29/601* (2013.01); *G06F 1/20* (2013.01); *G06F 2200/201* (2013.01)

(58) Field of Classification Search
CPC .... F04D 29/601; F04D 29/602; F04D 29/646; F04D 10/007; G06F 1/20
See application file for complete search history.

(56) References Cited

U.S. PATENT DOCUMENTS 8,721,276 B2 * 5/2014 Lu ...................... F04D 25/0613
 415/213.1
2017/0042060 A1 * 2/2017 Chen .................. F04D 25/0613

FOREIGN PATENT DOCUMENTS

TW M260082 U 3/2005

* cited by examiner

*Primary Examiner* — Woody A Lee, Jr.
*Assistant Examiner* — Brian O Peters
(74) *Attorney, Agent, or Firm* — Idea Intellectual Limited; Margaret A. Burke; Sam T. Yip (57) ABSTRACT

A quick-release mechanism for fan includes a first lateral cover, a second lateral cover, a latch member, a handle, and a pushing member. The first lateral cover has a slot hole. The latch member extends from the slot hole and has an engaging block and an actuation portion connected to the engaging block. The handle has a first pivot end and a second pivot end pivotally connected to the first lateral cover and the second lateral cover, respectively. The handle is movable between a first position and a second position. The pushing member is disposed at the first pivot end. When the handle is at the first position, the actuation portion moves toward the first lateral cover. When the handle is at the second position, the pushing member pushes the actuation portion to move toward a direction away from the inner surface.

28 Claims, 10 Drawing Sheets

ND FAN ASSEMBLY

QUICK-RELEASE MECHANISM FOR FAN, FIXING ASSEMBLY FOR FAN, AND FAN ASSEMBLY

CROSS-REFERENCE TO RELATED APPLICATION

This non-provisional application claims priority under 35 U.S.C. § 119(a) to Patent Application No. 109130112 in Taiwan, R.O.C. on Sep. 2, 2020, the entire contents of which are hereby incorporated by reference.

BACKGROUND

Technical Field

The instant disclosure relates to fixing a fan in a computer chassis, in particular, to a quick-release mechanism for fan, a fixing assembly for fan, and a fan assembly.

Related Art

Forced air-cool mechanism has to be configured in the computer chassis, so that the heat generated by the central processing unit (CPU), the graphics chip, the memory, or other hot components during operation can be effectively removed, thereby maintaining the normal operation of the system.

SUMMARY

For a fan fixing mechanism known to the inventor, screws or other fixation members are utilized for fixing the fan within the computer chassis. After the screws pass through the fixation holes of the fan, the screws are locked on the chassis structure, thereby providing a proper fixation performance. However, in a computer chassis with limited space, for example a server computer chassis having a 1U height, the space in the computer chassis is small and narrow, such that tools cannot be operated in the space easily. As a result, for fixing the fan within the small-height chassis, soft rubber plugs or other packing structures are utilized. Regarding the case where soft rubber plugs or other packing structures are used, the fan may be unfirmly positioned within the chassis. Moreover, within the small and narrow space, the tasks for inserting and fixing the power cable of the fan cannot be achieved easily as well. Consequently, the tasks for fixing the fan within the small-height chassis still have the time-consuming issue.

In view of this, according to one or some embodiments of the instant disclosure, a quick-release mechanism for fan, a fixing assembly for fan, and a fan assembly are provided. Therefore, without tools, the fan can be assembled on or disassembled from the chassis quickly, and the fixation of the fan can be achieved effectively.

In one embodiment of the instant disclosure, a quick-release mechanism for fan is provided. The quick-release mechanism for fan is adapted to be mounted to a fan. The fan has two lateral surfaces, a top surface connected to the two lateral surfaces, and two end surfaces connected to the two lateral surfaces. The quick-release mechanism for fan comprises a first lateral cover, a second lateral cover, a latch member, a handle, and a pushing member.

The first lateral cover and the second lateral cover are adapted to be mounted on the two lateral surfaces, respectively. The first lateral cover has a slot hole in communication with an outer surface and an inner surface of the first lateral cover, and the inner surface faces the corresponding lateral surface. The latch member extends from an edge of the slot hole. The latch member has an engaging block and an actuation portion. The engaging block normally protrudes from the outer surface, the actuation portion is connected to the engaging block, and an actuation gap is between the actuation portion and the inner surface of the first lateral cover. The handle has a first pivot end and a second pivot end. The first pivot end and the second pivot end are pivotally connected to the first lateral cover and the second lateral cover, respectively, so that the handle is rotatable with respect to the first lateral cover and the second lateral cover and is movable between a first position and a second position. At the first position, the handle is side-by-side arranged with the top surface; at the second position, an angle is between the handle and the top surface. The pushing member is disposed at the first pivot end and corresponds to the actuation portion. When the handle is at the first position, the actuation portion moves toward the first lateral cover; when the handle is at the second position, the pushing member pushes the actuation portion to move toward a direction away from the inner surface.

In at least one embodiment, the first pivot end is pivotally connected between the first lateral cover and the actuation portion.

In at least one embodiment, the actuation portion has a recessed opening facing the inner surface of the first lateral cover, and a shape of the pushing member is mated with a shape of the recessed opening. When the handle is at the first position, the pushing member enters into the recessed opening, so that the actuation portion moves toward the first lateral cover and is closely attached to the first pivot end.

In at least one embodiment, when the handle is at the first position, a height of the engaging block protruding from the outer surface of the first lateral cover is a first height, and when the handle is moved from the first position to the second position, the movement of the pushing member pushing the actuation portion is a second height, and the second height is greater than or equal to the first height.

In at least one embodiment, the second height is a height of a portion of the pushing member received in the recessed opening.

In at least one embodiment, the quick-release mechanism for fan further comprises a support extending from one of the first lateral cover and the second lateral cover, and a position of the support corresponds to one of the two end surfaces of the fan.

In at least one embodiment, the engaging block has a guide bevel.

In at least one embodiment, a protruding ear portion extends from an inner surface of the second lateral cover, a spacing distance is between the protruding ear portion and the second lateral cover, and the second pivot end is pivotally connected between the second lateral cover and the protruding ear portion.

In at least one embodiment, each of the lateral covers further comprises at least one fixation pin corresponding to the inner surface of the corresponding lateral cover, and an extension direction of the at least one fixation pin is parallel to the inner surface of the corresponding lateral cover.

In another embodiment of the instant disclosure, a fixing assembly for fan is provided. The fixing assembly for fan comprises a fan bracket and the foregoing quick-release mechanism. The fan bracket has at least two lateral walls and a receiving space between two of the lateral walls. One of the lateral walls has an engaging hole. The quick-release mechanism for fan is adapted to be disposed in the receiving space, and the engaging block is adapted to be engaged in the engaging hole.

In at least one embodiment, the fan fixing assembly further comprises a housing having an inner space, and the fan bracket is located in the inner space and mounted on the housing.

In yet another embodiment of the instant disclosure, a fan assembly is provided. The fan assembly comprises a fan and the foregoing quick-release mechanism for fan. The fan has two lateral surfaces and a top surface connected to the two lateral surfaces. The first lateral cover and the second lateral cover of the quick-release mechanism for fan are adapted to be mounted on the two lateral surfaces, respectively.

In at least one embodiment, the fan has a plurality of recessed portions, and the fan further has a plurality of fixation holes at the recessed portions; the first lateral cover and the second lateral cover have a plurality of fixation pins adapted to be inserted into the fixation holes, so that the first lateral cover and the second lateral cover are respectively mounted on the two lateral surfaces.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
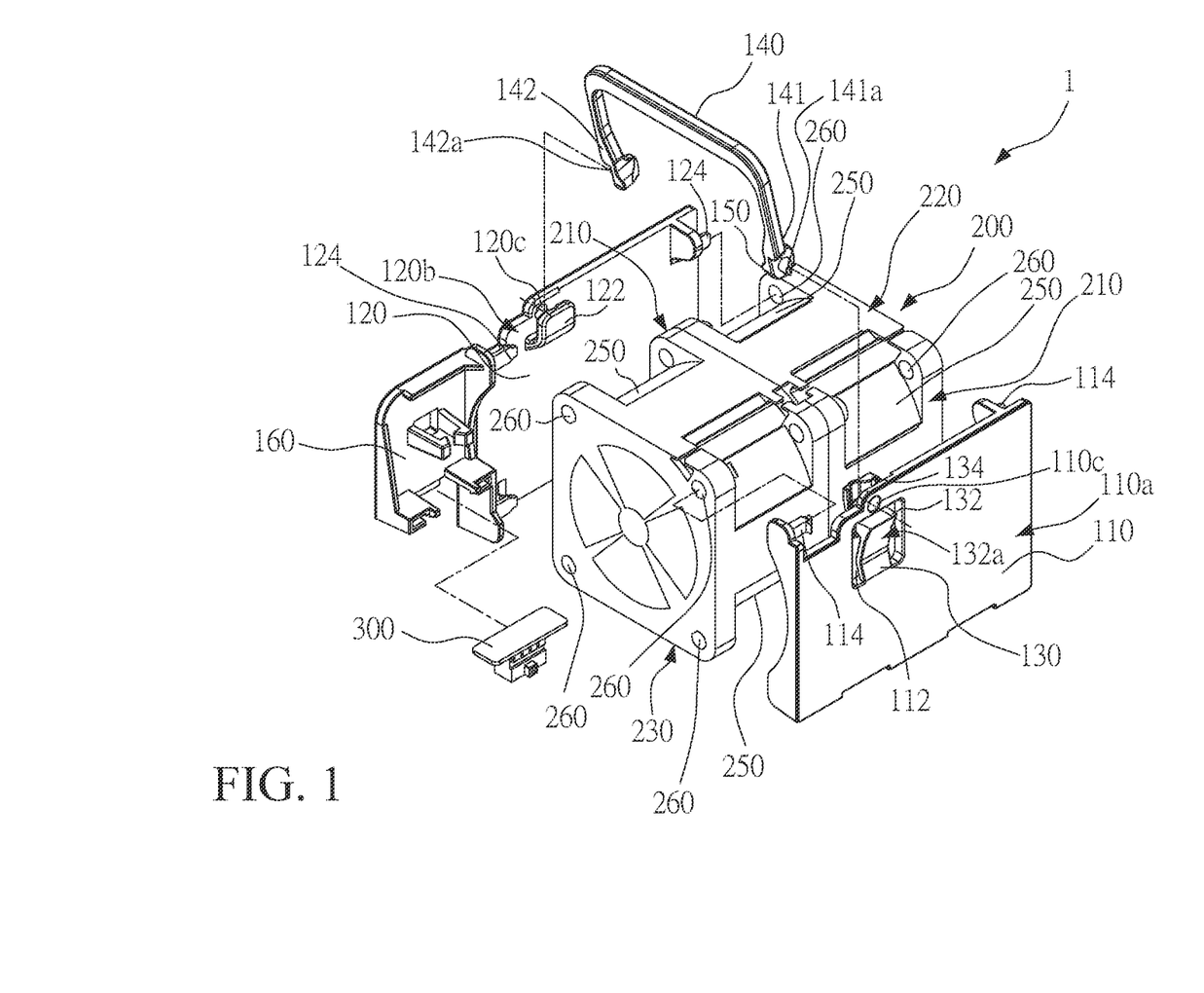
FIG. 1 illustrates an exploded view of a fan assembly according to an exemplary embodiment of the instant disclosure.
Figure 2:
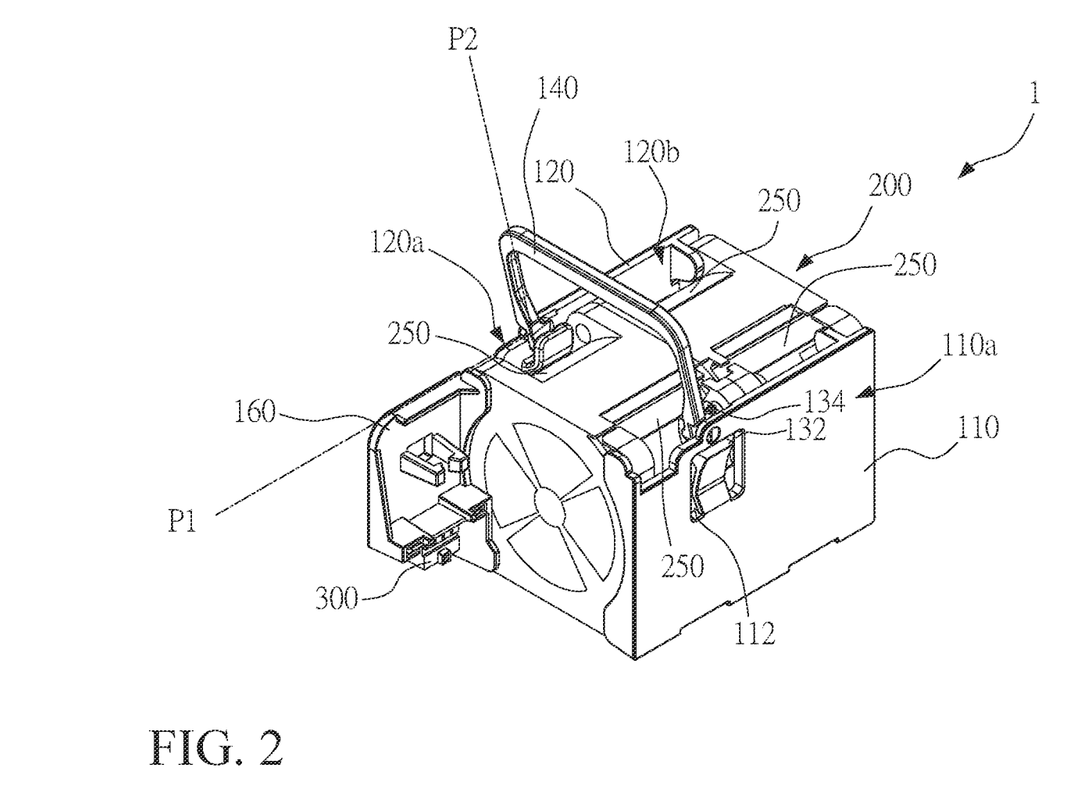
FIG. 2 illustrates a perspective view of the fan assembly of the exemplary embodiment.
Figure 3:
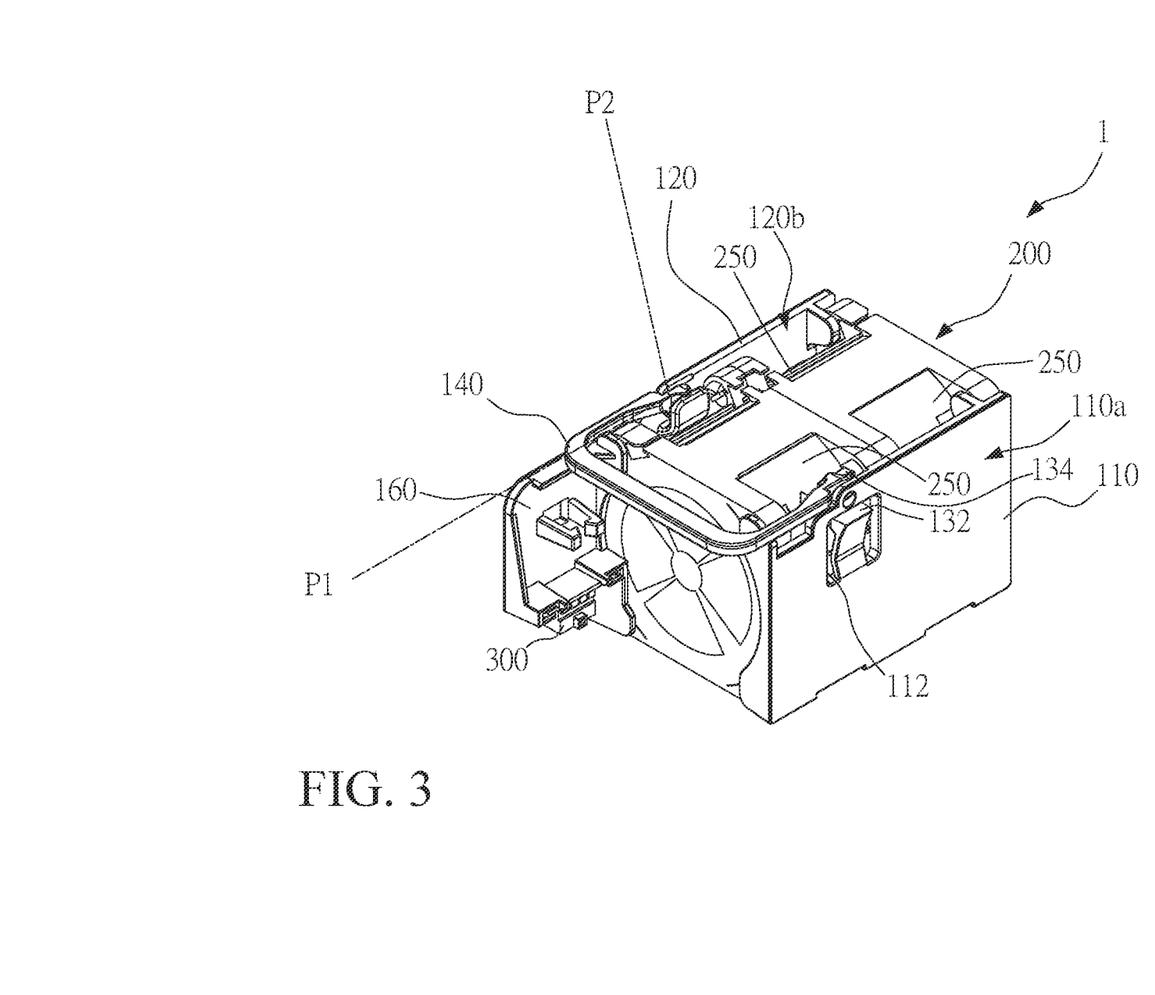
FIG. 3 illustrates another perspective view of the fan assembly of the exemplary embodiment.

As shown in FIG. 1, FIG. 2, and FIG. 3, a quick-release mechanism for fan according to the embodiment of the instant disclosure is provided and is adapted to be mounted on a fan 200, so that the quick-release mechanism for fan and the fan 200 are combined with each other to form a fan assembly 1. As shown in FIG. 1, the fan 200 has two lateral surfaces 210 and has a top surface 220 and a bottom surface 230 that are connected to the two lateral surfaces 210. The fan 200 has an air-flow channel penetrating through two end surfaces of the fan 200 along an air-flow direction. The two lateral surfaces 210, the top surface 220, and the bottom surface 230 are configured to be substantially parallel to the air-flow direction.

As shown in FIG. 1, FIG. 2, and FIG. 3, the quick-release mechanism for fan includes a first lateral cover 110, a second lateral cover 120, a latch member 130, a handle 140, and a pushing member 150.

Figure 4:
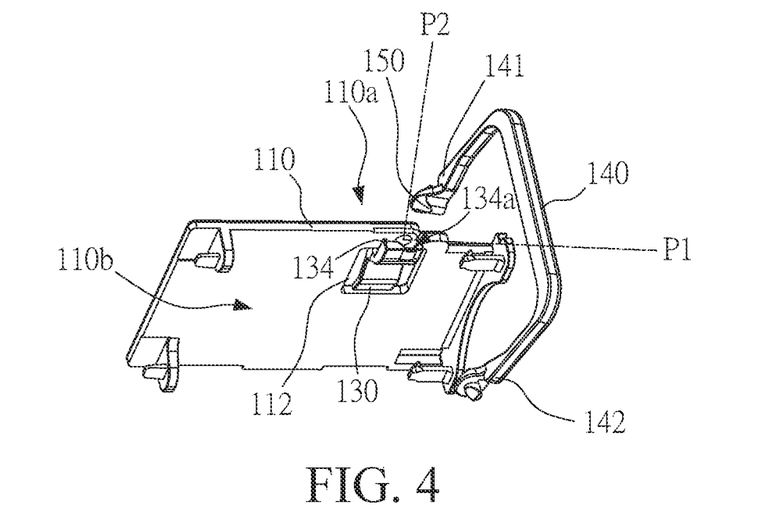
FIG. 4 and FIG. 5 illustrate perspective views of the first lateral cover and the handle of the exemplary embodiment, respectively.
Figure 5:
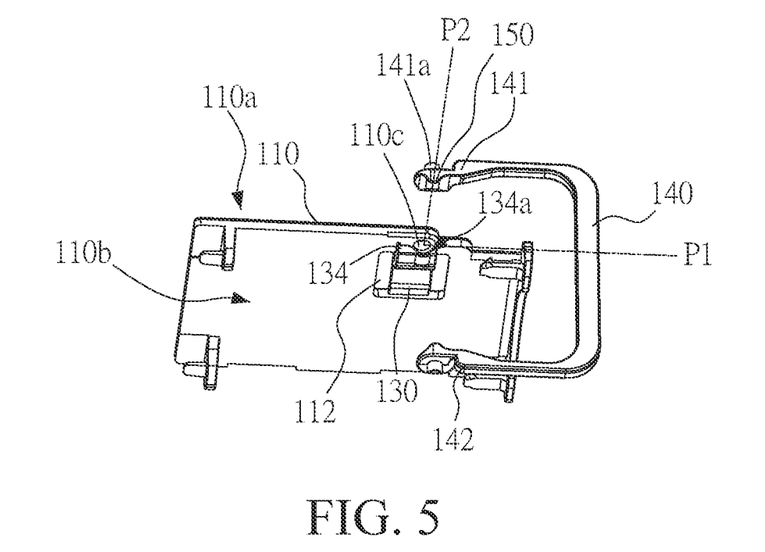

Please refer to FIG. 4 and FIG. 5, the first lateral cover 110 and the second lateral cover 120 are adapted to be mounted on the two lateral surfaces 210. Each of the first lateral cover 110 and the second lateral cover 120 has an outer surface 110a, 120a and an inner surface 110b, 120b, and each of the inner surfaces 110b, 120b faces the corresponding lateral surface 210. The first lateral cover 110 has a slot hole 112 in communication with the inner surface 110b and the outer surface 110a of the first lateral cover 110.

As shown in FIG. 1, FIG. 2, and FIG. 3, the fan 200 has a plurality of recessed portions 250, and the recessed portions 250 are at the lateral surfaces 210, the top surface 220, or the bottom surface 230, or between the lateral surfaces 210 and the top surface 220, or between the lateral surfaces 210 and the bottom surface 230. The fan 200 further has a plurality of fixation holes 260 at the recessed portions 250, and the extension direction of the fixation holes 260 is parallel to the air-flow direction. The first lateral cover 110 and the second lateral cover 120 further have a plurality of fixation pins 114, 124 corresponding to the inner surfaces 110b, 120b. The fixation pins 114, 124 are adapted to be inserted into the fixation holes 260, so that the first lateral cover 110 and the second lateral cover 120 are respectively mounted on the two lateral surfaces 210 of the fan 200.

Please refer to FIG. 1 to FIG. 5. The latch member 130 extends from an edge of the slot hole 112, and the latch member 130 has an engaging block 132 and an actuation portion 134. The engaging block 132 normally protrudes from the outer surface 110a, and the actuation portion 134 is connected to the engaging block 132.

As shown in FIG. 4 and FIG. 5, an actuation gap is between the actuation portion 134 and the inner surface 110b of the first lateral cover 110. Moreover, the actuation portion 134 has a recessed opening 134a facing the inner surface 110b of the first lateral cover 110.

As shown in FIG. 1, FIG. 2, and FIG. 3, the handle 140 has a first pivot end 141 and a second pivot end 142. The first pivot end 141 is pivotally connected to the first lateral cover 110, and the second pivot end 142 is pivotally connected to the second lateral cover 120, so that the handle 140 is rotatable with respect to the first lateral cover 110 and the second lateral cover 120 and is movable between a first position P1 and a second position P2.

As shown in FIG. 3 and FIG. 5, at the first position P1, the handle 140 is side-by-side arranged with the top surface 220; at the second position P2, an angle is between the handle 140 and the top surface 220. The angle may be near 90 degrees, so that a user can directly hold the handle 140 to move the fan assembly 1.

As shown in FIG. 1, FIG. 4, and FIG. 5, specifically, in this embodiment, the first pivot end 141 is pivotally connected between the first lateral cover 110 and the actuation portion 134. the first lateral cover 110 has a pivot hole 110c, the first pivot end 141 has a pivot shaft 141a, and the pivot shaft 141a is inserted into the pivot hole 110c of the first lateral cover 110.

As shown in FIG. 1, similarly, a protruding ear portion 122 extends from the inner surface 120b of the second lateral cover 120, and a distance spacing is between the protruding ear portion 122 and the second lateral cover 120. The second pivot end 142 is pivotally connected between the second lateral cover 120 and the protruding ear portion 122. The second lateral cover 120 has a pivot hole 120c, the second pivot end 142 has a pivot shaft 142a, and the pivot shaft 142a is inserted into the pivot hole 120c of the second lateral cover 120.

As shown in FIG. 1, FIG. 4, and FIG. 5, the pushing member 150 is disposed at the first pivot end 141 and corresponds to the actuation portion 134 of the latch member 130. In this embodiment, the pushing member 150 is integrally formed with the handle 140, while in some embodiments, the pushing member 150 and the handle 140 are separated components, and the pushing member 150 is assembled on the first pivot end 141.

Terms "first" and "second" used in the first lateral cover 110 and the second lateral cover 120 are provided for distinguish the two lateral covers 110, 120, rather than limiting the position of the slot hole 112 and the latch member 130. The slot hole 112 and the latch member 130 may be disposed at the second lateral cover 120, or slot holes 112 and latch members 130 may be disposed at both the first lateral cover 110 and the second lateral cover 120. Similarly, terms "first" and "second" used in the first pivot end 141 and the second pivot end 142 are provided for describing the position relationships of the pushing member 150 and the latch member 130. The pushing member 150 may be disposed at the second pivot end 142 and corresponding to the slot hole 112 and the latch member 130 at the second lateral cover 120, or pushing members 150 may be disposed at both the first pivot end 141 and the second pivot end 142 for corresponding to different slot holes 112 and latch members 130.

Figure 6:
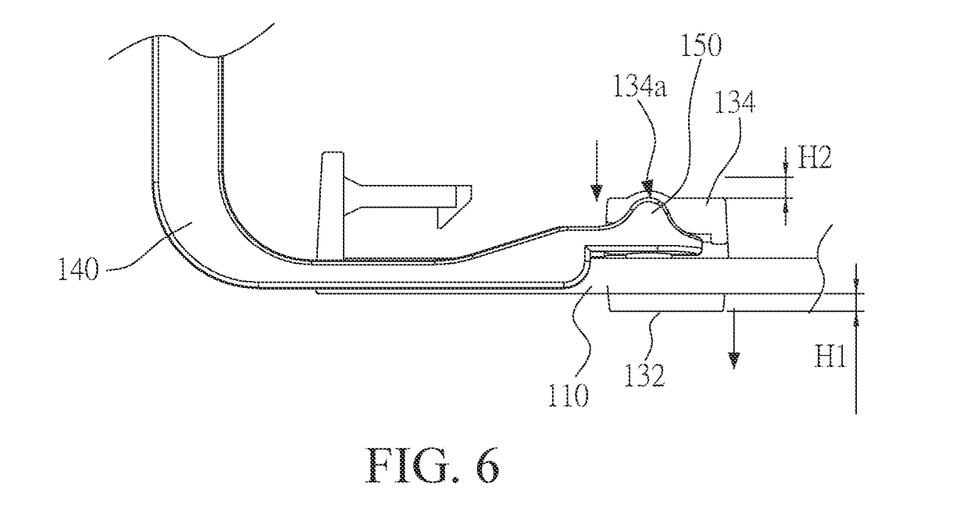
FIG. 6 and FIG. 7 illustrate top views of the first lateral cover and the handle of the exemplary embodiment, respectively.

Please refer to FIG. 3, FIG. 5, and FIG. 6. When the handle 140 is at the first position P1, the pushing member 150 enters into the recessed opening 134a, so that the actuation portion 134 moves toward the first lateral cover 110 and is closely attached to the first pivot end 141, thus the engaging block 132 protrudes from the outer surface 110a of the first lateral cover 110. When the handle 140 is at the second position P2, the pushing member 150 is detached off the recessed opening 134a and pushes the actuation portion 132 in a detaching direction away from the inner surface 110b, so that the actuation portion 134 drives the engaging block 132 to move from the outer surface 110a of the first lateral cover 110 toward the inner surface 110b of the first lateral cover 110, and the engaging block 132 then does not protrude from the outer surface 110a of the first lateral cover 110.

Figure 7:
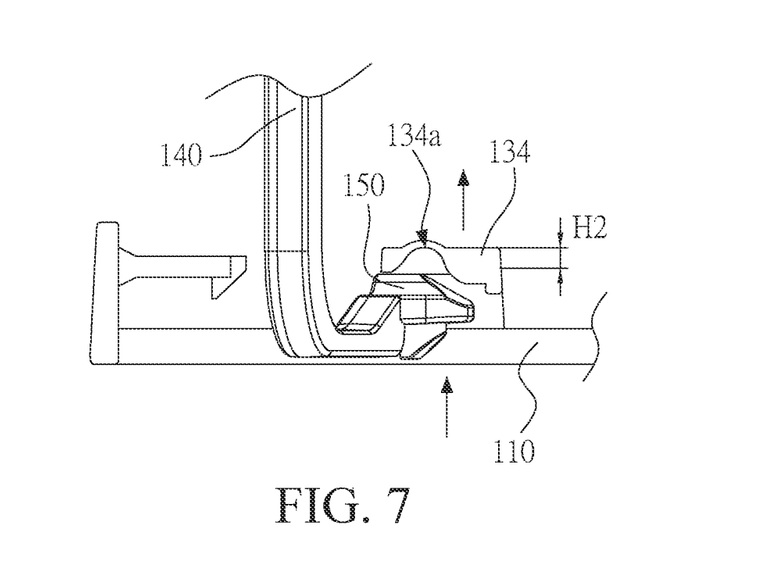

As shown in FIG. 5 and FIG. 6, the shape of the pushing member 150 is mated with a shape of the recessed opening 134a. When the handle 140 is at the first position P1, the pushing member 150 can be completely received in the recessed opening 134a and does not interfere with the actuation portion 134. In this situation, the first pivot end 141 is substantially in contact with the actuation portion 134, so that the actuation portion 134 moves toward the first lateral cover 110 and is closely attached to the first pivot end 141, and the engaging block 132 can protrude as much as possible from the outer surface 110a of the first lateral cover 110. As shown in FIG. 4 and FIG. 7, when the handle 140 is at the second position p2, the movement of the pushing member 150 pushing the actuation portion 134 is configured to allow the engaging block 132 to have a sufficient movement, so that the engaging block 132 does not protrude from the outer surface 110a of the first lateral cover 110.

As shown in FIG. 6 and FIG. 7, in one embodiment, in order to fulfill the foregoing requirements, a certain proportion relationship between the engaging block 132 and the pushing member 150 has to be satisfied. When the handle 140 is at the first position P1, the height of the engaging block 132 protruding from the outer surface 110a of the first lateral cover 110 is a first height H1. When the handle 140 moves from the first position P1 to the second position P2, the movement of the pushing member 150 pushing the actuation portion 134 is a second height h2, and the second height H2 has to be greater than or equal to the first height H1. More specifically, in the foregoing embodiment(s), the second height H2 is a height of a portion of the pushing member 150 received in the recessed opening 134a. When the pushing member 150 detaches off the recessed opening 134a and contacts the actuation portion 134, the pushing member 150 pushes the actuation portion 134 to move with a movement of the second height H2, so that the engaging block 132 is driven to move with the movement of the second height H2 as well.

As shown in FIG. 1, FIG. 2, and FIG. 3, in one embodiment, the quick-release mechanism for fan further includes a bracket 160 extending from one of the two lateral covers 110, 120 (not limited to be the first lateral cover 110 or to be the second lateral cover 120). The position of the support 160 corresponds to the position of one of the two end surfaces of the fan 200, and the support 160 substantially protrudes from the end surface of the fan 200. The support 160 is adapted to position a fan connector 300, so that the power cable of the fan 200 and the fan connector 300 can be parts of the fan assembly 1 and thus the assembling and disassembling of the fan assembly 1 can be achieved easily.

Figure 8:
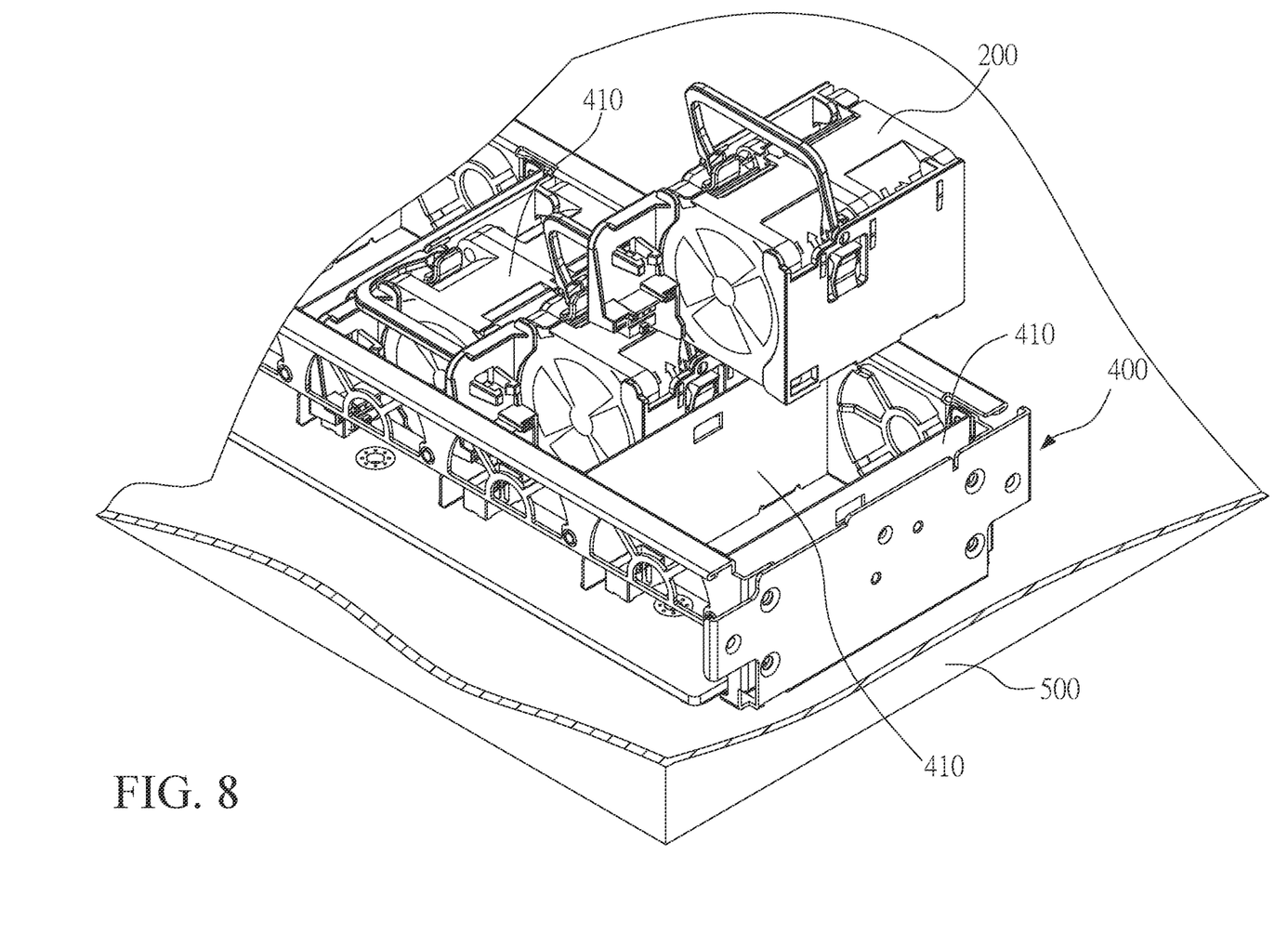
FIG. 8 illustrates a partial perspective view of a fixing assembly for fan according to an exemplary embodiment of the instant disclosure.
Figure 9:
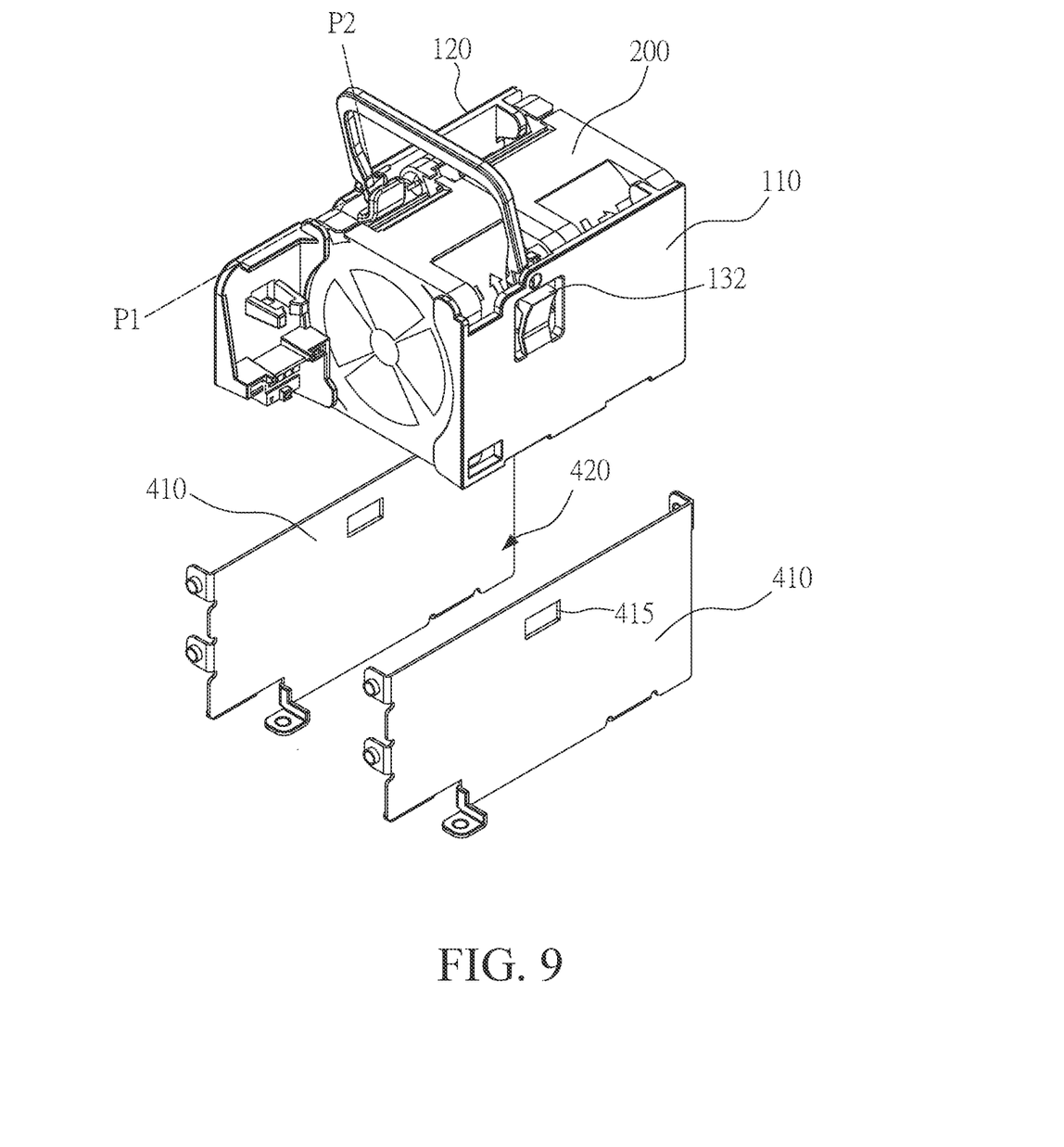
FIG. 9 illustrates a perspective view of the two lateral walls, the quick-release mechanism for fan, and the fan of the exemplary embodiment.

Please refer to FIG. 8 and FIG. 9, a fixing assembly for fan according to another exemplary embodiment of the instant disclosure is provided. The fixing assembly for fan is adapted to position the fan 200 at a determined position, for example, a determined position in the computer chassis. The fixing assembly for fan has a fan bracket 400 and one or more quick-release mechanisms for fan, and the one or more quick-release mechanisms are adapted to mount one or more fans 200 on the fan bracket 400. The fan bracket 400 may be an individual component and is position in the computer chassis through threading, riveting, or other connection mechanisms. In one embodiment, the fan bracket 400 may be parts of the computer chassis. In other words, in such embodiment, the fixing assembly for fan further includes a housing 500, the housing 500 has an inner space, and the fan bracket 400 is located in the inner space of the housing 500 and mounted on the housing 500.

As shown in FIG. 8 and FIG. 9, the fan bracket 400 has at least two lateral walls 410 and a receiving space 420 between the at least two lateral walls 410. One of the at least two lateral walls 410 has an engaging hole 415 corresponding to the engaging block 132 of the quick-release mechanism for fan. The number of the receiving spaces 420 corresponds to the number of the quick-release mechanisms for fan and the number of the fans 200. Each of the receiving spaces 420 is adapted to receive one quick-release mechanism and the fan 200 combined with the quick-release mechanism.

Figure 10:
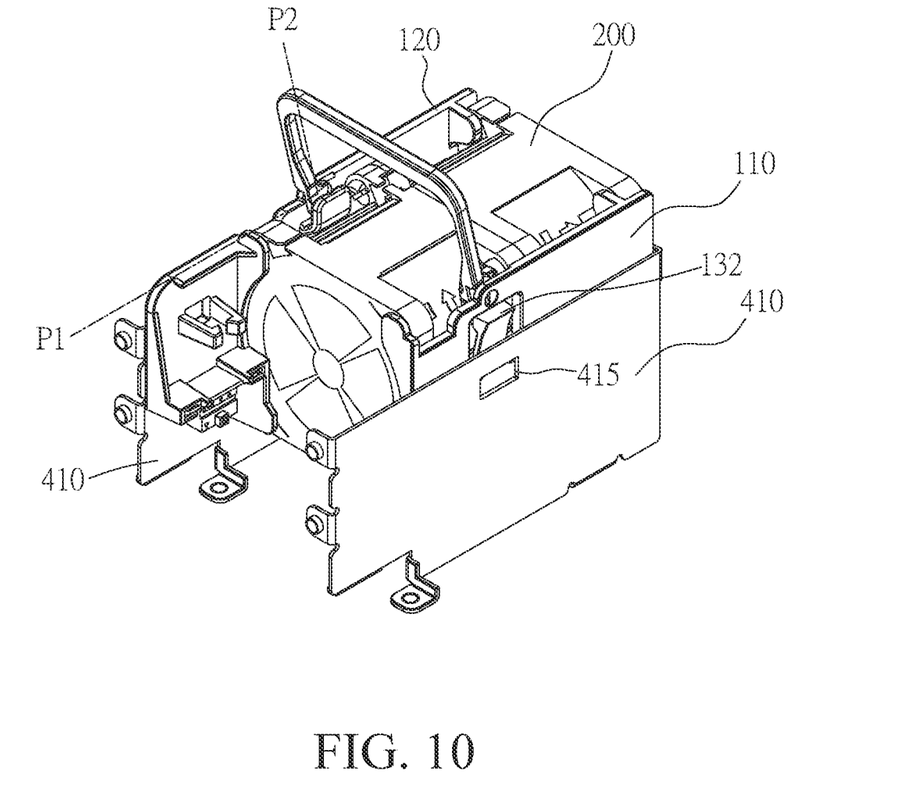
FIG. 10 illustrates another perspective view of the two lateral walls, the quick-release mechanism for fan, and the fan of the exemplary embodiment.
Figure 11:
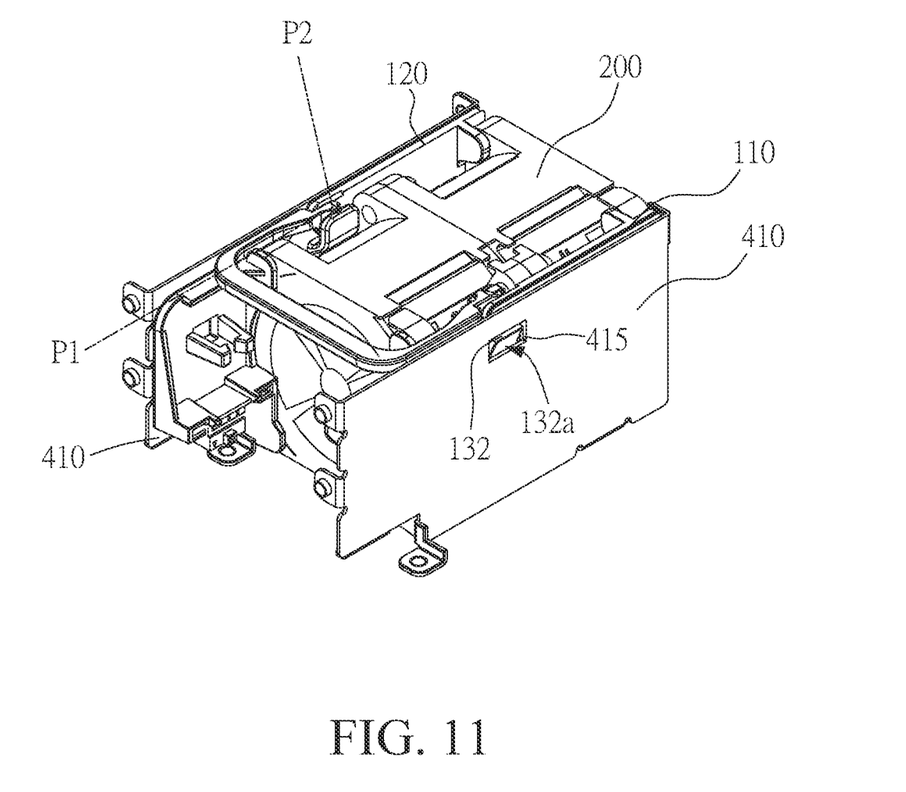
FIG. 11 illustrates yet another perspective view of the two lateral walls, the quick-release mechanism for fan, and the fan of the exemplary embodiment.

As shown in FIG. 9, FIG. 10, and FIG. 11, the first lateral cover 110 and the second lateral cover 120 of the quick-release mechanism for fan are mounted on the two lateral surfaces 210 of the fan 200. Moreover, the quick-release mechanism for fan is adapted to be disposed in the receiving space 420, and the engaging block 132 is adapted to be engaged in the engaging hole 415, so that the fan 200 is positioned on the fan bracket 400. Adjacent receiving spaces 420 may share the same lateral wall 410. In other words, in this embodiment, one lateral wall 410 corresponds to the first lateral cover 110 of one quick-release mechanism for fan and the second lateral cover 120 of another quick-release mechanism for fan at the same time. Moreover, in such embodiment, each of the lateral walls 410 has the engaging holes 415.

As shown in FIG. 1 and FIG. 10, the engaging block 132 has a guide bevel 132a. When the handle 140 is at the second position P2, the engaging block 132 does not protrude from the outer surface 110a of the first lateral cover 110. Then, the user can hold the handle 140 and put the fan 200 along with the quick-release mechanism for fan between the two lateral walls 410. The first lateral cover 110 and the second lateral cover 120 respectively correspond to the two lateral walls 410, especially that in this embodiment, the first lateral cover 110 with the engaging block 132 has to correspond to the lateral wall 410 having the engaging hole 415. If the handle 140 is not located at the second position P2 properly, the engaging block 132 will slightly protrude from the outer surface 110a of the first lateral cover 110. Under this situation, when the guide bevel 132a of the engaging block 132 contacts the top edge of the lateral wall 410, the guide bevel 132a guides the engaging block 132 to move inwardly to contact the surface of the lateral wall 410, thus avoiding having the engaging block 132 to be slightly protruding which will lead the quick-release mechanism for fan cannot be received in the receiving space 420.

As shown in FIG. 11, when the quick-release mechanism for fan is completely received in the receiving space 420 between the two lateral walls 410 and the handle 140 is at the first position P1, the engaging block 132 is released and protrudes from the outer surface 110a of the first lateral cover 110, and the engaging block 132 is engaged in the engaging hole 415, so that the fan 200 is positioned between the two lateral walls 410.

As shown in FIG. 11, the fan 200 is limited between the two lateral walls 410, and the fan 200 is prevented from detaching off the receiving space 420 through the combination between the engaging block 132 and the engaging hole 415. Therefore, the fan 200 can be positioned effectively. Moreover, for achieving the fan positioning process, the user just put the quick-release mechanism for fan and the fan 200 combined with the quick-release mechanism and rotate the handle 140 to the first position P1. Tools are not used in the fan positioning process, and the quick-release mechanism is closely attached to the outside of the fan 200 without forming any protruding structure. Therefore, the quick-release mechanism for fan according to one or some embodiments of the instant disclosure can be utilized in small and narrow spaces.

Figure 12:
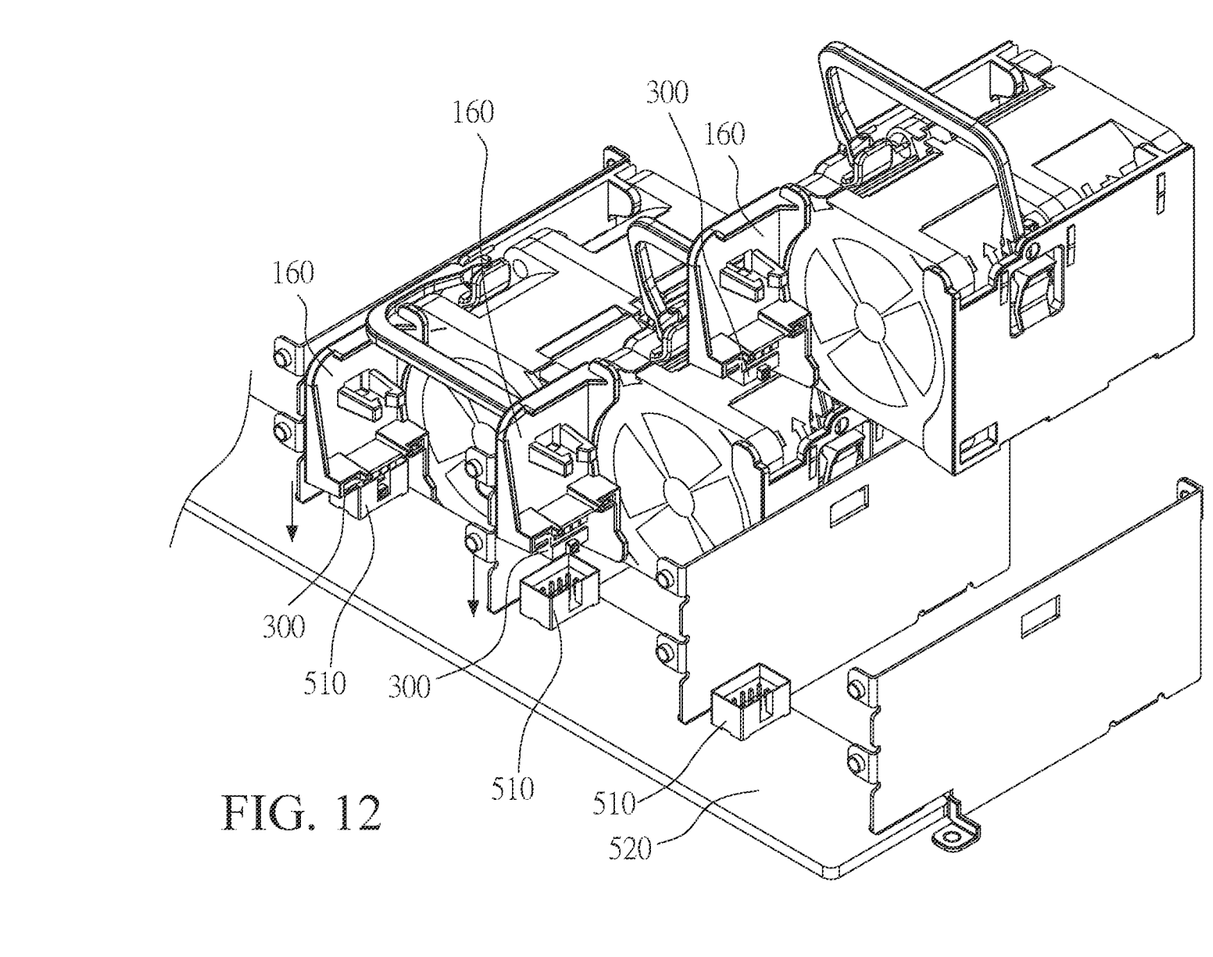
FIG. 12 illustrates a perspective view of some components of the fixing assembly for fan of the exemplary embodiment.

As shown in FIG. 12, moreover, the support 160 and the fan connector 300 move toward the housing 500 such that the fan connector 300 is inserted into an electrical connector 510. The electrical connector 510 is disposed in the housing 500, the position of the electrical connector 510 corresponds to the position of the support 160, and the electrical connector 510 is adapted to be connected to the fan connector 300. The electrical connector 510 may be directly disposed on the inner wall of the housing 500, and may be disposed on a circuit board 520 mounted on the inner wall of the housing 500, such that the electrical connector 510 can be indirectly disposed on the inner wall of the housing 500.

As shown in FIG. 10, similarly, when the fan 200 is to be detached from the fan bracket 400, the user just pulls the handle 140 upwardly to allow the handle 140 to move to the second position P2, then the engaging block 132 detaches off the engaging hole 415 and releases the first lateral cover 110. Next, the user just continuously pulls the handle 140 upwardly, and the fan 200 can be detached off the fan bracket 400.

According the quick-release mechanism for fan of one or some embodiments of the instant disclosure, the assembling and disassembling of the fan can be achieved by simply performing the puling and putting actions. Moreover, the fan is still positioned through engaging and limiting structures, thereby having a proper positioning effect. In at least one embodiment, the fan connector is also integrated into the quick-release mechanism for fan. Therefore, when the assembling or disassembling of the fan is achieved, the plugging or unplugging or the fan connector is achieved as well, thereby further increasing the convenience for the user.

What is claimed is:

1. A quick-release mechanism for fan, adapted to be mounted on a fan, wherein the fan has two lateral surfaces, a top surface connected to the two lateral surfaces, and two end surfaces connected to the two lateral surfaces, wherein the quick-release mechanism for fan comprises:
   a first lateral cover and a second lateral cover adapted to be mounted on the two lateral surfaces, respectively, wherein the first lateral cover has a slot hole in communication with an outer surface and an inner surface of the first lateral cover, and the inner surface faces the corresponding lateral surface;
   a latch member extending from an edge of the slot hole, wherein the latch member has an engaging block and an actuation portion; the engaging block normally protrudes from the outer surface, the actuation portion is connected to the engaging block, and an actuation gap is between the actuation portion and the inner surface of the first lateral cover;
   a handle having a first pivot end and a second pivot end, wherein the first pivot end and the second pivot end are pivotally connected to the first lateral cover and the second lateral cover, respectively, so that the handle is rotatable with respect to the first lateral cover and the second lateral cover and is movable between a first position and a second position; at the first position, the handle is side-by-side arranged with the top surface; at the second position, an angle is between the handle and the top surface; and
   a pushing member disposed at the first pivot end and corresponding to the actuation portion of the latch member, wherein when the handle is at the first position, the actuation portion moves toward the first lateral cover; when the handle is at the second position, the pushing member pushes the actuation portion to move toward a direction away from the inner surface.

2. The quick-release mechanism for fan according to claim 1, wherein the first pivot end is pivotally connected between the first lateral cover and the actuation portion.

3. The quick-release mechanism for fan according to claim 2, wherein the actuation portion has a recessed opening facing the inner surface of the first lateral cover, and a shape of the pushing member is mated with a shape of the recessed opening; when the handle is at the first position, the pushing member enters into the recessed opening, so that the actuation portion moves toward the first lateral cover and is closely attached to the first pivot end.

4. The quick-release mechanism for fan according to claim 3, wherein when the handle is at the first position, a height of the engaging block protruding from the outer surface of the first lateral cover is a first height, and when the handle is moved from the first position to the second position, the movement of the pushing member pushing the actuation portion is a second height, and the second height is greater than or equal to the first height.

5. The quick-release mechanism for fan according to claim 4, wherein the second height is a height of a portion of the pushing member received in the recessed opening.

6. The quick-release mechanism for fan according to claim 1, further comprising a support extending from one of the first lateral cover and the second lateral cover, and a position of the support corresponds to one of the two end surfaces of the fan.

7. The quick-release mechanism for fan according to claim 1, wherein the engaging block has a guide bevel.

8. The quick-release mechanism for fan according to claim 1, wherein a protruding ear portion extends from an inner surface of the second lateral cover, a spacing distance is between the protruding ear portion and the second lateral cover, and the second pivot end is pivotally connected between the second lateral cover and the protruding ear portion.

9. The quick-release mechanism for fan according to claim 1, wherein each of the lateral covers further comprises at least one fixation pin corresponding to the inner surface of the corresponding lateral cover, and an extension direction of the at least one fixation pin is parallel to the inner surface of the corresponding lateral cover.

10. A fixing assembly for fan, comprising:
a fan bracket having at least two lateral walls and a receiving space between two of the lateral walls, wherein one of the lateral walls has an engaging hole; and
the quick-release mechanism for fan according to claim 1, adapted to be disposed in the receiving space, and the engaging block is adapted to be engaged in the engaging hole.

11. The fixing assembly for fan according to claim 10, wherein the first pivot end is pivotally connected between the first lateral cover and the actuation portion.

12. The fixing assembly for fan according to claim 11, wherein the actuation portion has a recessed opening facing the inner surface of the first lateral cover, and a shape of the pushing member is mated with a shape of the recessed opening; when the handle is at the first position, the pushing member enters into the recessed opening, so that the actuation portion moves toward the first lateral cover and is closely attached to the first pivot end.

13. The fixing assembly for fan according to claim 12, wherein when the handle is at the first position, a height of the engaging block protruding from the outer surface of the first lateral cover is a first height, and when the handle is moved from the first position to the second position, the movement of the pushing member pushing the actuation portion is a second height, and the second height is greater than or equal to the first height.

14. The fixing assembly for fan according to claim 13, wherein the second height is a height of a portion of the pushing member received in the recessed opening.

15. The fixing assembly for fan according to claim 10, further comprising a support extending from one of the first lateral cover and the second lateral cover, and a position of the support corresponds to one of the two end surfaces of the fan.

16. The fixing assembly for fan according to claim 10, wherein the engaging block has a guide bevel.

17. The fixing assembly for fan according to claim 10, wherein a protruding ear portion extends from an inner surface of the second lateral cover, a spacing distance is between the protruding ear portion and the second lateral cover, and the second pivot end is pivotally connected between the second lateral cover and the protruding ear portion.

18. The fixing assembly for fan according to claim 10, wherein each of the lateral covers further comprises at least one fixation pin corresponding to the inner surface of the corresponding lateral cover, and an extension direction of the at least one fixation pin is parallel to the inner surface of the corresponding lateral cover.

19. The fixing assembly for fan according to claim 10, further comprising a housing having an inner space, wherein the fan bracket is located in the inner space and mounted on the housing.

20. A fan assembly, comprising:
a fan having two lateral surfaces and a top surface connected to the two lateral surfaces; and
the quick-release mechanism for fan according to claim 1, wherein the first lateral cover and the second lateral cover are adapted to be mounted on the two lateral surfaces, respectively.

21. The fan assembly according to claim 20, wherein the first pivot end is pivotally connected between the first lateral cover and the actuation portion.

22. The fan assembly according to claim 21, wherein the actuation portion has a recessed opening facing the inner surface of the first lateral cover, and a shape of the pushing member is mated with a shape of the recessed opening; when the handle is at the first position, the pushing member enters into the recessed opening, so that the actuation portion moves toward the first lateral cover and is closely attached to the first pivot end.

23. The fan assembly according to claim 22, wherein when the handle is at the first position, a height of the engaging block protruding from the outer surface of the first lateral cover is a first height, and when the handle is moved from the first position to the second position, the movement of the pushing member pushing the actuation portion is a second height, and the second height is greater than or equal to the first height.

24. The fan assembly according to claim 23, wherein the second height is a height of a portion of the pushing member received in the recessed opening.

25. The fan assembly according to claim 20, further comprising a support extending from one of the first lateral cover and the second lateral cover, and a position of the support corresponds to one of the two end surfaces of the fan.

26. The fan assembly according to claim 20, wherein the engaging block has a guide bevel.

27. The fan assembly according to claim 20, wherein a protruding ear portion extends from an inner surface of the second lateral cover, a spacing distance is between the protruding ear portion and the second lateral cover, and the second pivot end is pivotally connected between the second lateral cover and the protruding ear portion.

28. The fan assembly according to claim 20, wherein the fan has a plurality of recessed portions, and the fan further has a plurality of fixation holes at the recessed portions; the first lateral cover and the second lateral cover have a plurality of fixation pins adapted to be inserted into the fixation holes, so that the first lateral cover and the second lateral cover are respectively mounted on the two lateral surfaces.

* * * * *